(12) United States Patent
Tsui et al.

(10) Patent No.: US 8,310,339 B2
(45) Date of Patent: Nov. 13, 2012

(54) METHOD AND SYSTEM FOR TRIGGERING AN OPERATING DEVICE

(76) Inventors: Gallen Ka Leung Tsui, Brampton (CA); Philip Y. W. Tsui, Brampton (CA)

( * ) Notice: Subject to any disclaimer, the term of this patent is extended or adjusted under 35 U.S.C. 154(b) by 560 days.

(21) Appl. No.: 12/512,717

(22) Filed: Jul. 30, 2009

(65) Prior Publication Data

US 2011/0025457 A1    Feb. 3, 2011

(51) Int. Cl.
*G05B 19/00* (2006.01)

(52) U.S. Cl. ............ 340/5.7; 340/1.1; 340/5.1; 340/5.2; 200/295; 200/331; 257/111; 257/112; 257/115

(58) Field of Classification Search .............. 340/5.7, 340/5.52, 5.61, 5.26, 5.71, 12.32, 12.33, 340/12.37, 310.12, 310.16, 3.1; 200/331, 200/295; 375/219, 295, 344; 455/92, 151.1, 455/151.21
See application file for complete search history.

(56) References Cited

U.S. PATENT DOCUMENTS

| | | | | |
|---|---|---|---|---|
| 6,331,813 | B1 * | 12/2001 | Belliveau | 340/12.32 |
| 2003/0227370 | A1 * | 12/2003 | Brookbank et al. | 340/5.7 |
| 2005/0161312 | A1 * | 7/2005 | Agronin et al. | 200/330 |
| 2007/0229218 | A1 * | 10/2007 | Nassimi | 340/5.61 |
| 2008/0202909 | A1 * | 8/2008 | Agronin et al. | 200/331 |

* cited by examiner

*Primary Examiner* — George Bugg
*Assistant Examiner* — Sisay Yacob
(74) *Attorney, Agent, or Firm* — Haynes and Boone, LLP (57) ABSTRACT

A system and methods are provided for triggering an operating device. In one embodiment, a triggering device includes a receiving unit configured to receive one or more wireless control signals. The receiving unit may include a switch and a processor, wherein the processor is configured to control the switch for activation of an operating device coupled to a signaling line based, at least in part, on the one or more wireless control signals. According to another embodiment, the triggering device may include a connector configured to electrically couple the receiving unit to the signaling line, the connector having one or more contacts and a housing configured to clasp the signaling line and couple the one or more contacts to the signaling line. Additionally, the signaling line may relate to existing wiring of the operating device.

20 Claims, 6 Drawing Sheets

METHOD AND SYSTEM FOR TRIGGERING AN OPERATING DEVICE

FIELD OF THE INVENTION

The invention relates in general to a triggering device which activates an operating device and more particularly to system and methods for triggering an operating device using existing wiring of the operating device.

BACKGROUND

Conventional barrier operating devices, such as a garage door opener, typically employ at least one push-button switch that is wired to the operating device. Typically, the push-button switch is mounted near an entryway within an enclosed area or garage and requires manual activation by a user. Circuitry of the conventional push-button switch is generally limited to a single pole switch. Conventional and current operating devices, such as barrier control operators, lighting control operators and home automation operators, are configured for operation with a push-button switch as it is a generally desired feature, especially for residential use. Thus, garage door openers and operating devices in general typically include terminals that are dedicated for a signaling line to a push-button switch.

These devices similarly employ wireless circuitry to receive one or more wireless commands for activation of the operating device. Additionally, wireless activation of movable barriers may be a necessary and desired function for many users. For wireless operation of the barrier control device, wireless circuitry is typically provided by a wireless communication module within the barrier operating device. Wireless control of the barrier is typically provided by a dedicated transmitter programmed to operate with the barrier control device. Although many conventional barrier operating devices allow for one or more transmitters to be programmed with the operating device, programming may be difficult for many users. Unfortunately, and particularly in the case of barrier operating devices, it may be difficult to replace lost or damaged transmitters when the operating device has been discontinued. A conventional solution to the aforementioned problem is to replace wireless receiver circuitry of an operating device. This solution typically requires installation which may pose difficulties for most consumers.

Although there are many devices and systems for programming transmitters and/or operating devices, these solutions do not meet the need of many consumers. Thus, there is a need for a triggering device which satisfies one or more of the aforementioned drawbacks.

BRIEF SUMMARY OF THE INVENTION

Disclosed and claimed herein are a system and methods for a triggering device. In one embodiment, a triggering includes a receiving unit configured to receive one or more wireless control signals, the receiving unit including a switch and a processor. The processor is configured to control the switch for activation of an operating device coupled to a signaling line based, at least in part, on the one or more wireless control signals. In another embodiment, the triggering device further includes a connector configured to electrically couple the receiving unit to the signaling line. The connector includes one or more contacts and a housing configured to clasp the signaling line and couple the one or more contacts to the signaling line. The signaling line relates to existing wiring of the operating device.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF EXEMPLARY EMBODIMENTS

According to one aspect of the invention, the present disclosure aims to address one or more difficulties which may be associated with coupling a triggering device to existing signaling wires. Coupling a triggering device to existing wires without a connector of the present disclosure can pose a level of difficulty which may deter users from purchasing triggering devices. By way of example, to remove an existing push-button switch, an installer would have to remove the current push-button from a wall, undo screws and terminals which connect the wall switch and connect a receiving device in parallel to the push-button switch. Thus, the present disclosure is directed to a triggering device having a connector which can facilitate coupling of a triggering device to existing wires. Further, a triggering device connector according to the present invention may eliminate one or more of the aforementioned difficulties associated with coupling a triggering device to an operating device.

Unlike conventional methods and devices for control of operating devices, one aspect of the present invention relates to a triggering device having a connector which may be coupled to an existing signaling line for activation of an operating device. One advantage of the present invention may be to provide a connector which allows for an activation signal to an operating device, such as a movable barrier operator, garage door opener, home automation system or lighting control unit without replacing receiving circuitry of the operating device, formatting an activation signal for the operating device, programming the operating device, or running additional wiring to an operating device. Further, a triggering device having a connector according to the present invention may be configured for wireless control of the operating device by coupling the connector to an existing signaling line of the operating device. In that fashion, the present disclosure is directed to a triggering device that can simplify replacement and/or addition of a wireless transmitter for activation of an operating device.

According to another embodiment of the invention, the present disclosure relates to a novel connector of a triggering device which may be coupled to existing signaling lines of an operating device without the need to modify existing wiring of an operating device. By way of example, the connector may be coupled and/or snapped-on to wiring of an operating device thus eliminating the need for a user to remove components of an operating device. Advantages of the connector configuration may by simplified installation and greater customer appeal. The connector configuration may also allow for operation of an existing activation switch of the operating device to be maintained.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

Figure 1A:
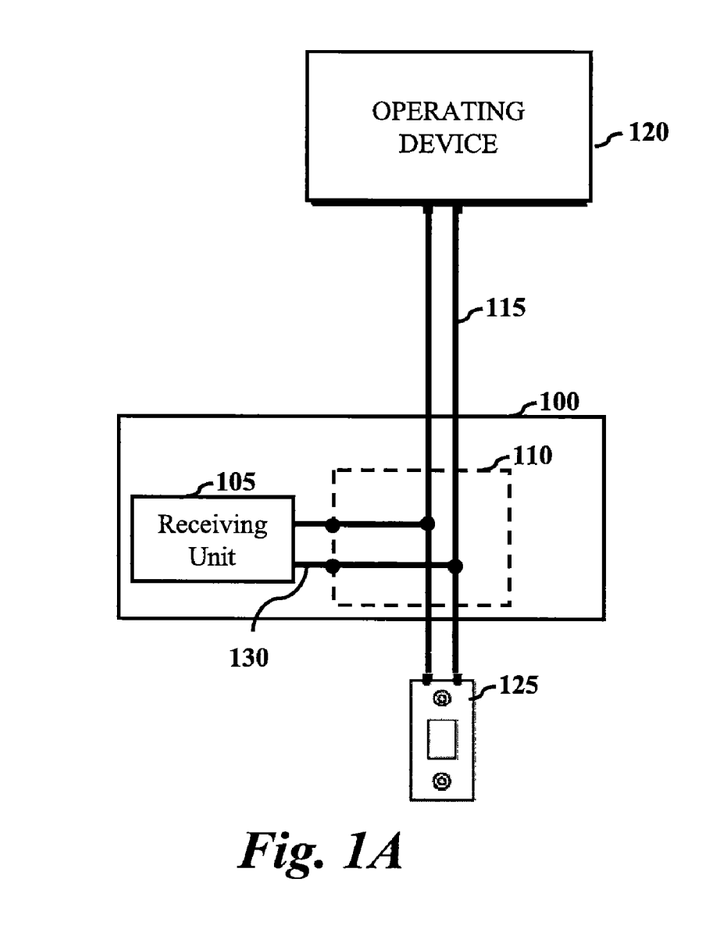
FIGS. 1A-1B depict simplified circuit diagrams of a triggering device according to one or more embodiments of the invention.
Figure 1B:
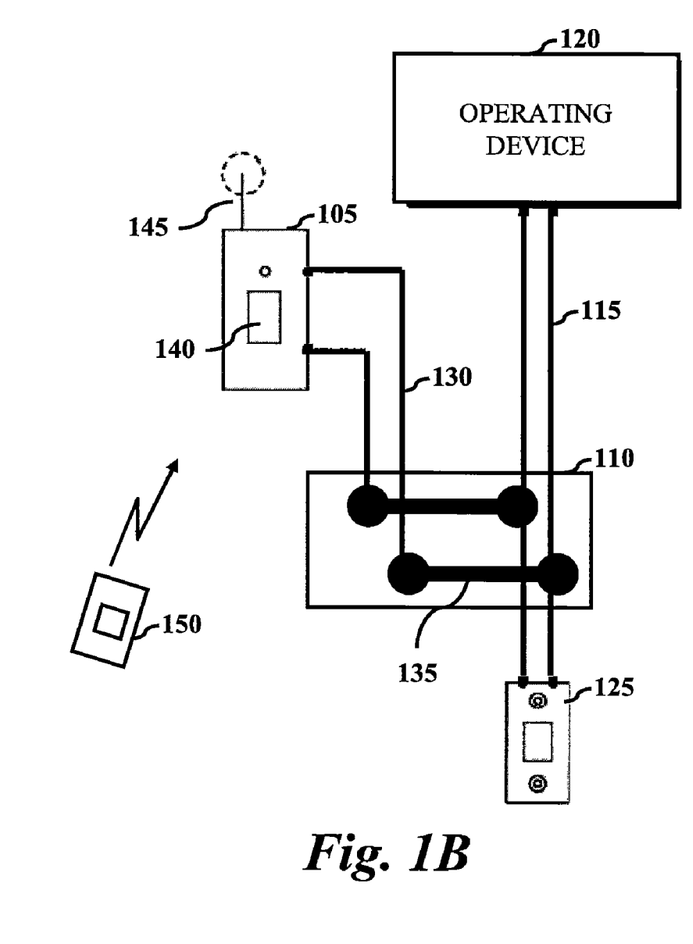

Referring now to the figures, FIGS. 1A-1B depict simplified block diagrams of a triggering device according to one or more embodiments of the invention. Referring first to FIG. 1A, triggering device 100 includes receiving unit 105 and connector 110. According to one embodiment of the invention, triggering device 100 may be coupled to signaling wires 115 of operating device 120. Operating device 120 may relate to one or more of a barrier operator (e.g., garage door opener), home automation operator, lighting control operator, etc. By coupling triggering device 100 to existing wiring of the operating device 120, triggering device 100 can activate and/or control operating device 120. Thus, triggering device 100 may be configured to interoperate with an installed operating device according to one or more embodiments of the invention. It should also be appreciated that triggering device 100 may be employed to provide wireless control for operating device 120. By way of example, when operating device 120 relates to a barrier control operator, triggering device 100 may be configured to control operation of a movable barrier. According to an alternative embodiment, when operating device 120 relates a home lighting operator, triggering device 100 may be configured to activate and/or deactivate one or more lighting units.

As shown in FIG. 1A, operating device 120 is coupled to activation switch 125 by signaling lines 115. Signaling lines 115 are shown as a wire pair, however, it should be appreciated that triggering device 100 may be configured to output activation signals on one or more lines. Triggering device 100 may be coupled to signaling lines 115, which may be existing wiring, of operating device 120. One advantage of the arrangement of FIG. 1A, is that triggering device 100 can replace and/or provide wireless control for operating device 120. Unlike conventional approaches, triggering device 100 may simplify replacement and/or programming of receiving circuitry for operating device 120. In certain embodiments, triggering device 100 may be coupled to operating device 120 without the need to disassemble operating device 120, configure wiring and/or re-wire a push-button switch of operating device 120.

According to another embodiment of the invention, connector 110 may be coupled to receiving device 105 by wire pair 130. As will be described in more detail below in FIGS. 4A-4B and 5A-5B, connector 110 may have one or more configurations. For example, in certain embodiments, connector 110 may be separate from receiving unit 105. In another embodiment, connector 110 may relate to a molded plastic housing containing receiving unit 105.

FIG. 1B depicts the triggering unit of FIG. 1A, wherein receiving unit 105 is configured for wireless control of operating device 120. As shown, antenna 145 of receiving unit 105 may be configured to receive one or more wireless signals from transmitter 150 to control operation of operating device 120. Receiving unit 105 may be configured to receive encoded data such as pulse width modulated signals, and/or Dual Tone Multi-Frequency (DTMF) signals. According to one embodiment, receiving unit 105 may relate to a rolling code receiver configured to decode one or more control signals using a rolling code algorithm to enhance security. Therefore, receiving unit 105 may be configured to receive a rolling code signal in one or more of On-Off Keying (OOK), Amplitude Shift Keying (ASK) or Frequency Shifted Keying (FSK) can be processed by to ensure the received code is a valid signal to activate operating device 120.

Receiving unit 105 may similarly output an activation signal to operating device 120 based on user activation of a push-button switch 140. Alternatively, or in combination, an activation signal can be sent to the operating device 120 by pulse width modulation and/or Dual Tone Multi-Frequency (DTMF) digital signals. As shown, metal connectors 135 of connector 110 electrically couple receiving device 105 to operating device 120. In that fashion, triggering device 100 may bypass wireless communication circuitry of operating device 120. According to another embodiment, transmitter 150 may be configured to transmit one or more wireless control signals to receiving unit 105 not recognized by operating device 120. In that fashion, control signals provided by transmitter 150 will not result in activation of an existing wireless receiver of the operating device.

Figure 2:
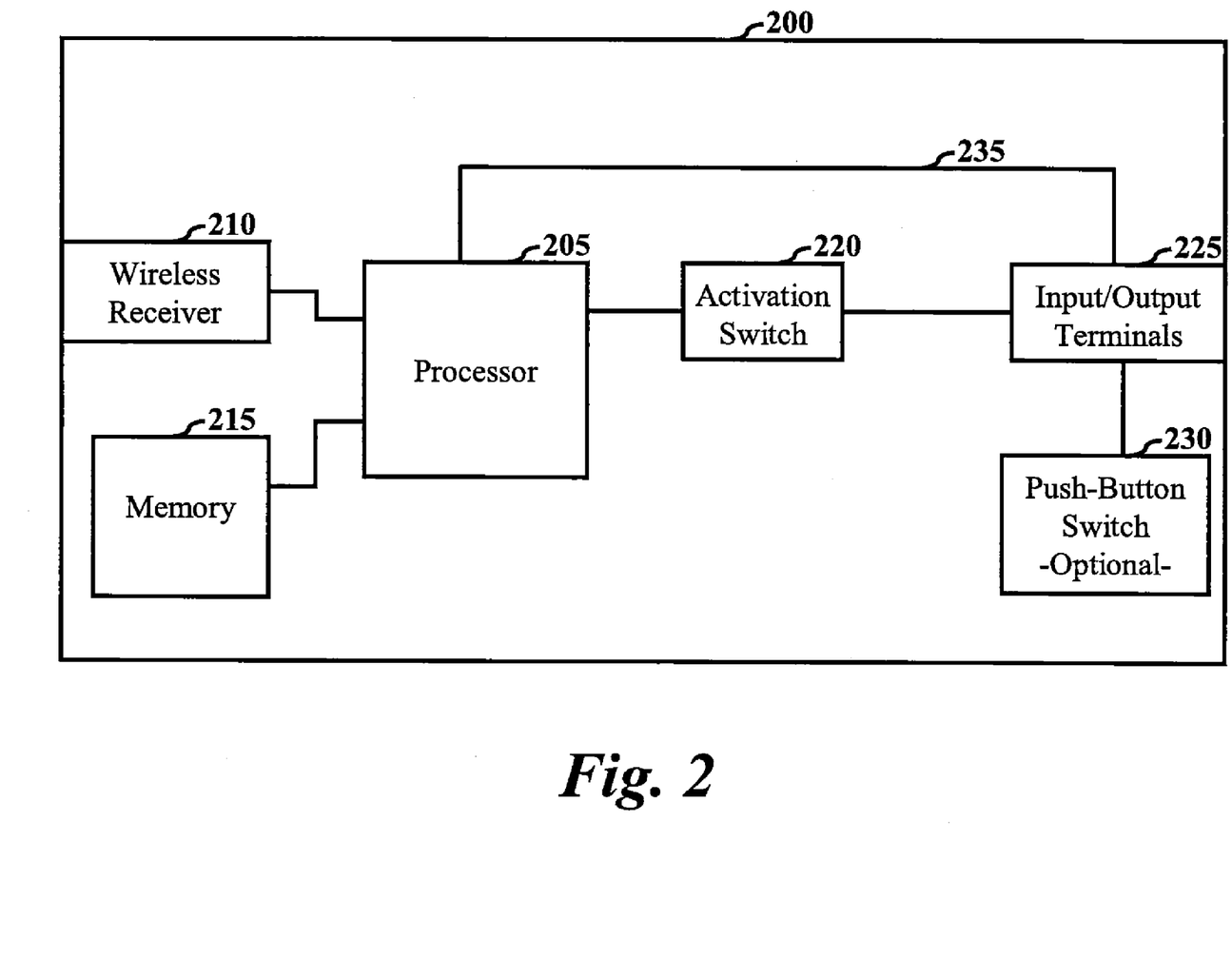
FIG. 2 depicts a simplified block diagram of a receiving unit according to one embodiment of the invention.

Referring now to FIG. 2, a simplified block diagram is depicted of a receiving unit according to one embodiment of the invention. As shown in FIG. 2, receiving unit 200 includes processor 205 coupled to wireless receiver 210, memory 215, and activation switch 220. Processor 205 can relate to one or more of microprocessor, and controller in general and may be configured to operate based on one or more commands stored by memory 215. Memory 215 may be one of a RAM, ROM, eeprom, and flash memory. Receiving unit 200 further includes terminals 225 for coupling to a connector (e.g., connector 110). In one embodiment, wireless receiver 210 may be configured to receive one or more wireless signals from a transmitter (e.g., transmitter 150) for control of an operating device (e.g., operating device 120). Processor 205 may be configured to decode the wireless control signals and output a control signal to activation switch 220 based on one or more signals received by wireless receiver 210. As such, processor 205 can output one or more control signals to a signaling line of an operating device by control of activation switch 220. For example, closing activation switch 220 can short signaling lines and activate, or deactivate, an operating device. According to another embodiment, processor 205 may be configured to output one or more pulse width modulation and/or DTMF signals to an operating device via signaling path 235 and input/output terminals 225.

According to one embodiment, receiving unit 200 may be coupled to signaling lines (e.g., signaling lines 115) to simplify installation. Signaling lines may be easily accessible to an installer, such as a do-it-yourself installer. Further, coupling receiving unit 200 to the signaling lines may not require the installer to perform wiring. Coupling receiving unit 200 to the signaling line by a connector according to the present disclosure will not defeat the function of an original receiver.

One advantage of coupling receiving unit 200 to signaling lines may be that control of the operating device may be provided by controlling activation switch 220. For example, an operation device may include a push-button switch wherein activation of the switch opens, stops and/or closes a barrier. As such, control of the operating device may be based on activation of a wall control switch (e.g., wall control switch 125). Thus, the present invention takes advantage of control features of an operating device which may be enabled by signaling lines of the operating device.

Receiving unit 200 may include optional push-button switch 230. Activation of push-button switch 230 by a user may activate activation switch 220 to output a control signal on terminal 225 according to one embodiment of the invention. In that fashion, receiving device 200 may additionally act as a replacement push-button switch.

Figure 3:
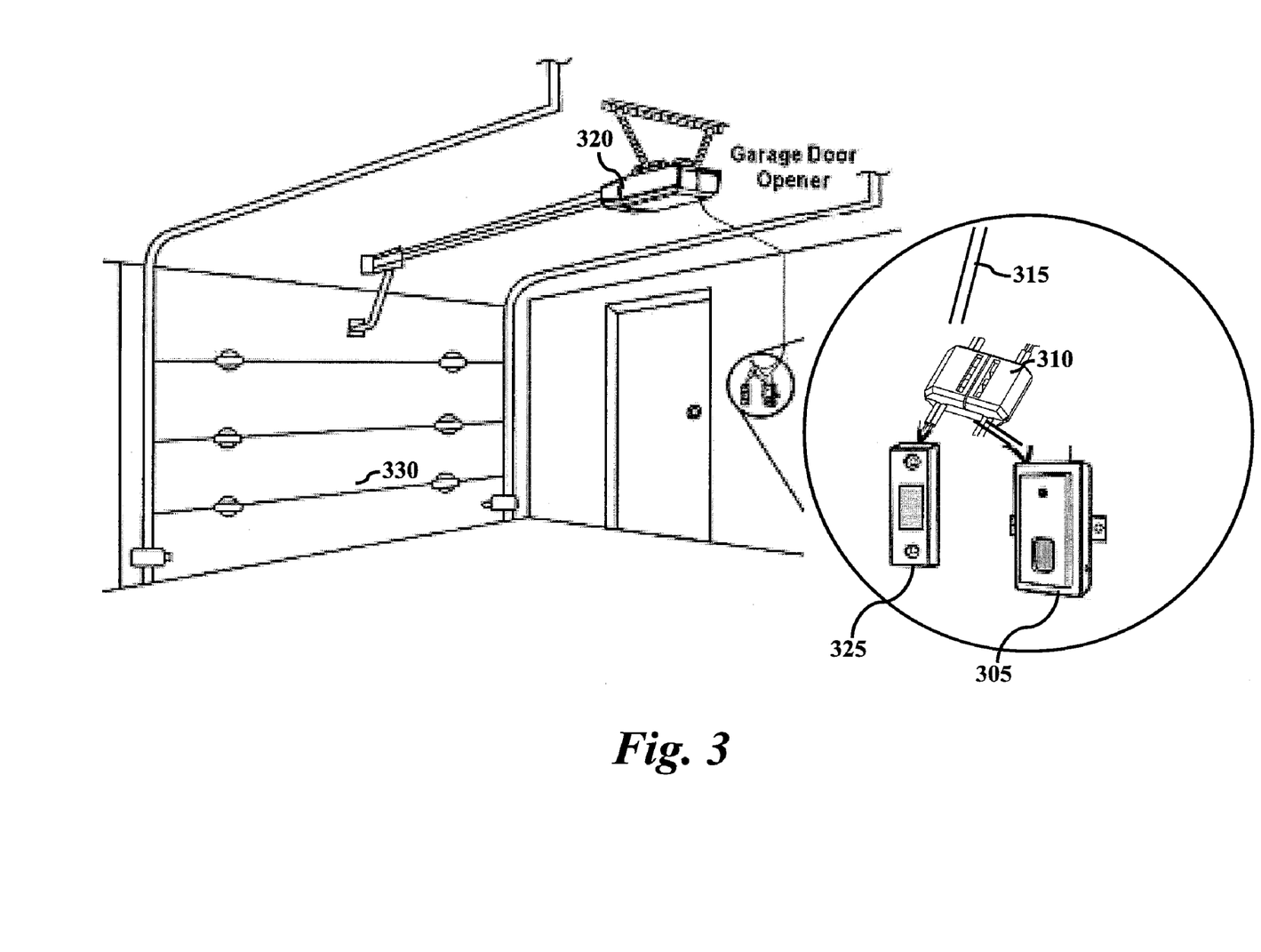
FIG. 3 depicts a graphical representation of a triggering device for control of a barrier operator according to one embodiment of the invention.

Referring now to FIG. 3, a graphical representation is depicted of the triggering device of FIGS. 1A-1B for control of a barrier operator according to one embodiment of the invention. The triggering device in FIG. 3 includes receiving unit 305 (e.g., receiving unit 105) and connector 310 (e.g., connector 110). As shown, connector 310 is coupled to signaling line 315. Signaling line 315 couples wall switch 325 to garage door opener 320. Thus, receiving unit 305 may be configured to activate garage door opener 320 to open, close and stop garage door 330. According to another embodiment, receiving unit 305 and connector 310 may be employed on an existing signaling line 315 and allows for operation of wall switch 325. Further, connector 310 may be coupled to signaling line 315 with out requiring the operator to adjust wiring of the garage door opener.

According to another aspect of the invention, the present invention is directed to a connector which may allow for reduced installation and/or minimal installation by user. Thus, a triggering device may be coupled to existing wiring of an operating device without the need to wiring or re-wiring the operating device. FIGS. 4A-4B and 5A-5B depict graphical representations of a triggering device connector according to one or more embodiments of the invention.

Figures 4A, 4B:
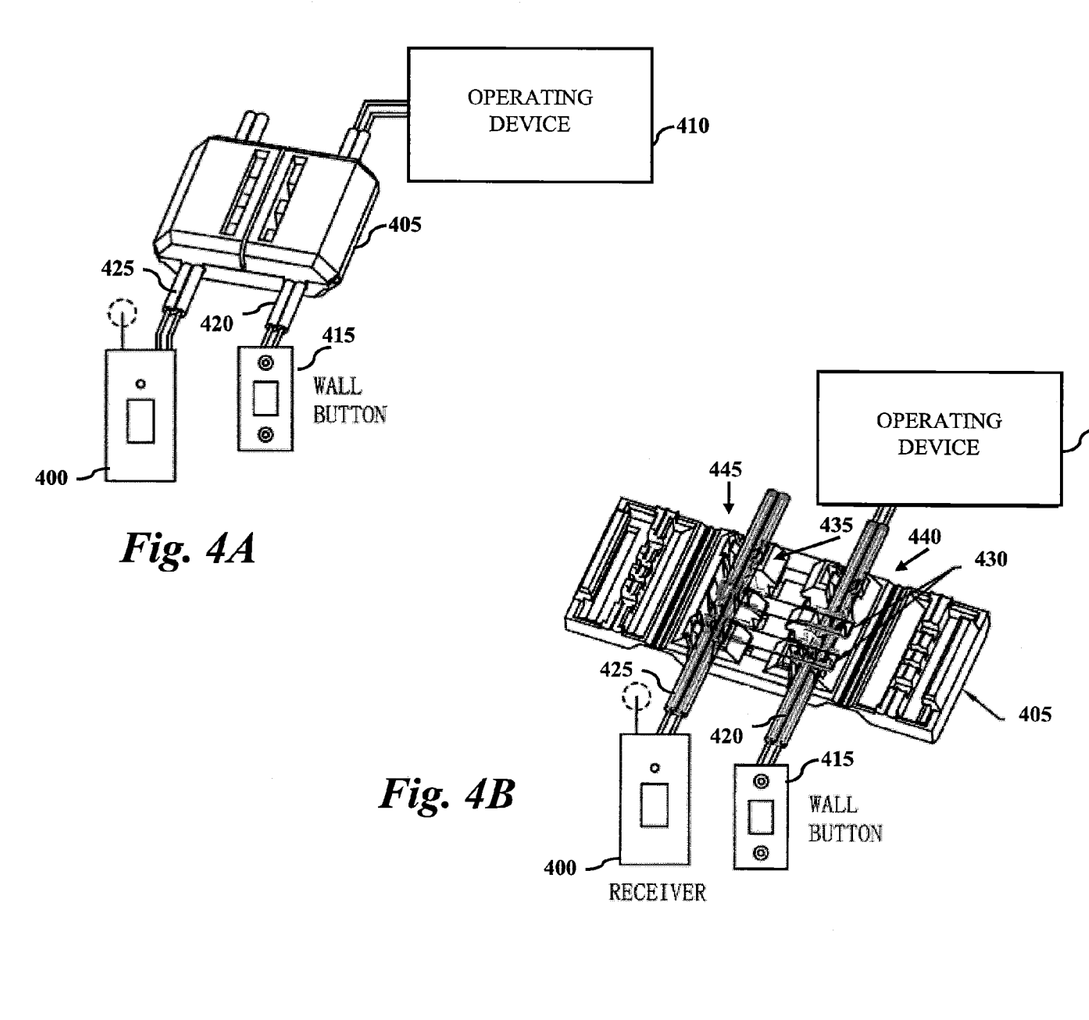
FIGS. 4A-4B depict graphical representations of triggering device connectors according to one or more embodiments of the invention.

Referring first to FIG. 4A, a folding connector is shown according to one or more embodiments of the invention. Connector 405 may be coupled to signaling line 420 which couples wall button 415 to operating device 410. According to one embodiment, connector 405 electrically couples receiving unit 400 to signaling line 420. Receiving unit 400 may be coupled to connector 405 by signal wires 425.

According to one embodiment, connector 405 may relate to a snap connector, wherein a housing of the connector may engage signaling line 425 when the housing is in a closed position as shown in FIG. 4A. In that fashion, the connector housing and/or one or more contacts may be clamped and/or securely fastened to signaling line 425 such that the movable portions of connector 405 may be fixedly secured to signaling line 420 and/or signal wires 425 as shown in FIG. 4A. Connector 405 may include means for securing movable portion in a fixed manner.

As shown in FIG. 4B, movable portions of connector 405 are shown in an open position to allow for an installer to couple connector 405 to signaling line 420. Connector 405 comprises terminals 430 for coupling to signaling line 420 and terminals 435 for coupling to wire pair 425. Terminals 430 and 435 may be electrically coupled by metal contacts and/or trace lines of connector 405. As further shown in FIG. 4B, connector 405 is shown as a housing with first and second movable portions to receive signaling lines 420 and signal wires 425. Connector 405 additionally provides clasping means 440 for signaling lines 420 and clasping means 445 for signaling line 425. Clasping means of connector 405 may include at least two channels or passage ways for receiving signaling line 420 and signal wires 425 and one or more contacts. According to another embodiment, one or more metal contacts of connector 405 may puncture sheathing of a signaling line to contact a conductor of signaling lines. Alternatively, contacts of connector 405 may be coupled to wiring with removed shielding.

In an exemplary embodiment, the housing of connector 405 may be comprised of molded plastic and may be clasped to one or more signaling lines by clasping means 440, 445 and movable portions of the housing of connector 405. AS such, portions of the connector housing may be configured to flex or fold in one embodiment, such that connector 405 may be fastened to signaling lines 420. It may also be appreciated that the housing of connector 405 may employ a hinge or similar device (not shown in FIGS. 4A-4B) to allow connector 405 to clasp signaling line 420.

Although, receiving unit 400 and connector 405 are shown separately in FIGS. 4A-4B, the units may be housed in a single housing according to one embodiment (not shown in FIGS. 4A-4B). Accordingly, terminals of connector 405 may be coupled to terminals of receiving unit 400 within the housing of connector 405.

Figures 5A, 5B:
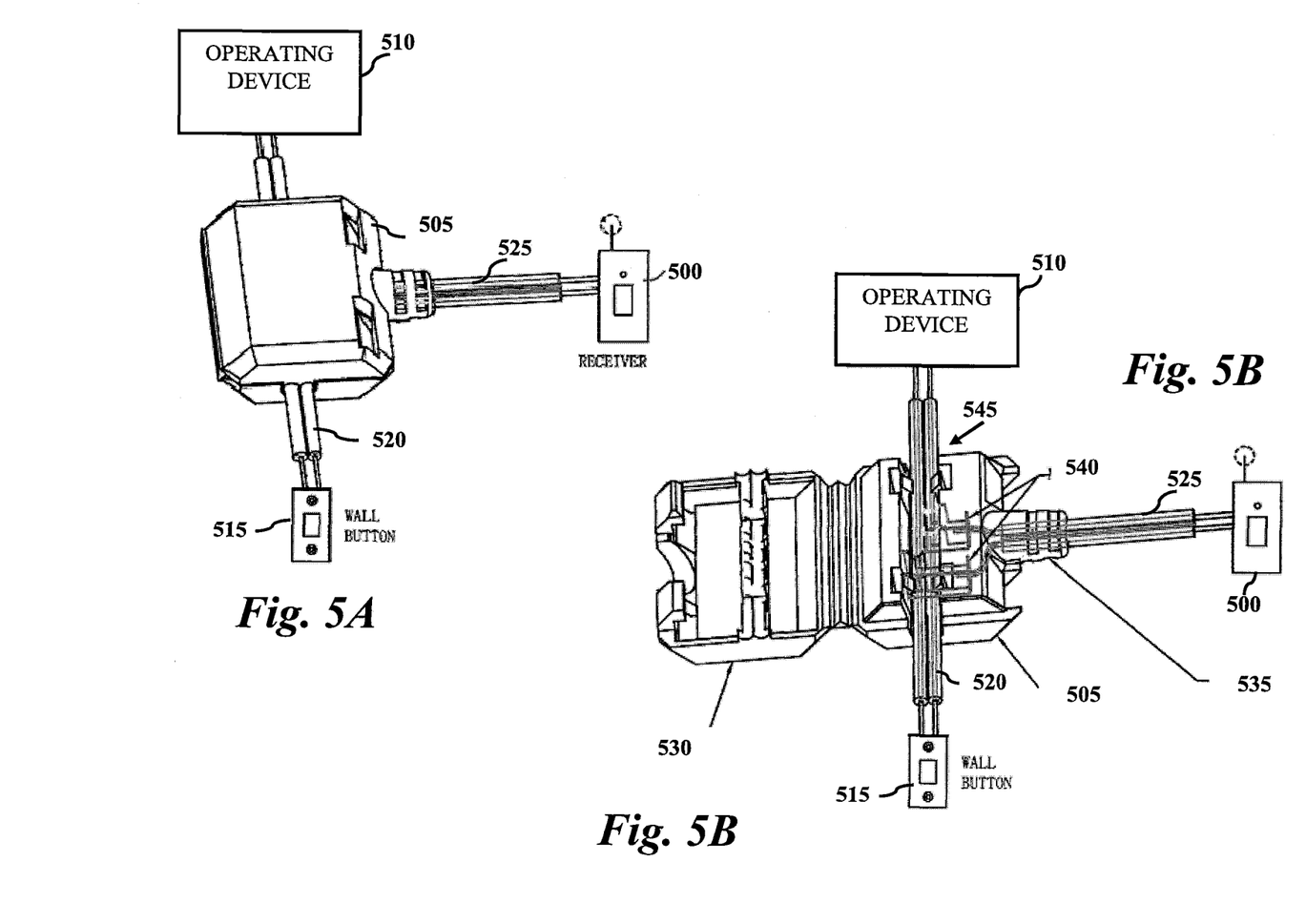
FIGS. 5A-5B depict graphical representations of triggering device connectors according to one or more embodiments of the invention.

FIGS. 5A-5B depict graphical representations of a triggering device connector according to one or more embodiments of the invention. Referring first to FIG. 5A, a folding connector is shown according to one or more embodiments of the invention. Connector 505 may be coupled to signaling line 520 which couples wall button 515 to operating device 510. Metal terminals 540 of connector 505 electrically couple receiving unit 500 to signaling line 520 and operating device 510. Receiving unit 500 may be coupled to connector 505 by signal wires 525. As shown in FIG. 5A, connector 505 is depicted in a clasped and/or closed position.

Referring now to FIG. 5B, connector 505 is depicted in an unclasped or open position as movable portion 530 of connector housing is separated from the housing. As shown in FIG. 5B, terminals 540 of connector 500 may couple wire pair 525 to signaling line 520. Connector 505 additionally provides clasping means for signaling lines 520. The housing of connector 505 may be comprised of molded plastic to include passage way 545 for signaling line 520. Metal contacts of connector 505 may puncture sheathing to contact a conductor of the signaling lines. According to another embodiment, connector 505 may relate to a snap connector. In that fashion, the connector housing and/or one or more contacts may be clasped and/or securely fastened to signaling line 520 by snapping the housing together.

Connector 505 in FIG. 5B is depicted as having a single passageway 545 for signaling line 520. According to one embodiment, a portion of the connector housing, shown as 535, may allow for one or more of a pigtail connection and mold-in connector to be coupled to connector 505. Thus, a pigtail connection and/or mold-in connector may be coupled to terminals 540 of connector 505. It may also be appreciated that receiving unit 500 may be coupled to one of a pigtail connection and mold-in connector by signaling wires 525. Accordingly, installation of a triggering device to signaling line 520 may be performed by coupling signaling wires 525 to housing portion 535, and clasping connector 505 to signaling line 520. In this fashion, the present invention greatly simplifies connection of a triggering device to existing signaling lines of an operating device without the need for wiring and further in a user friendly manner.

Figure 6:
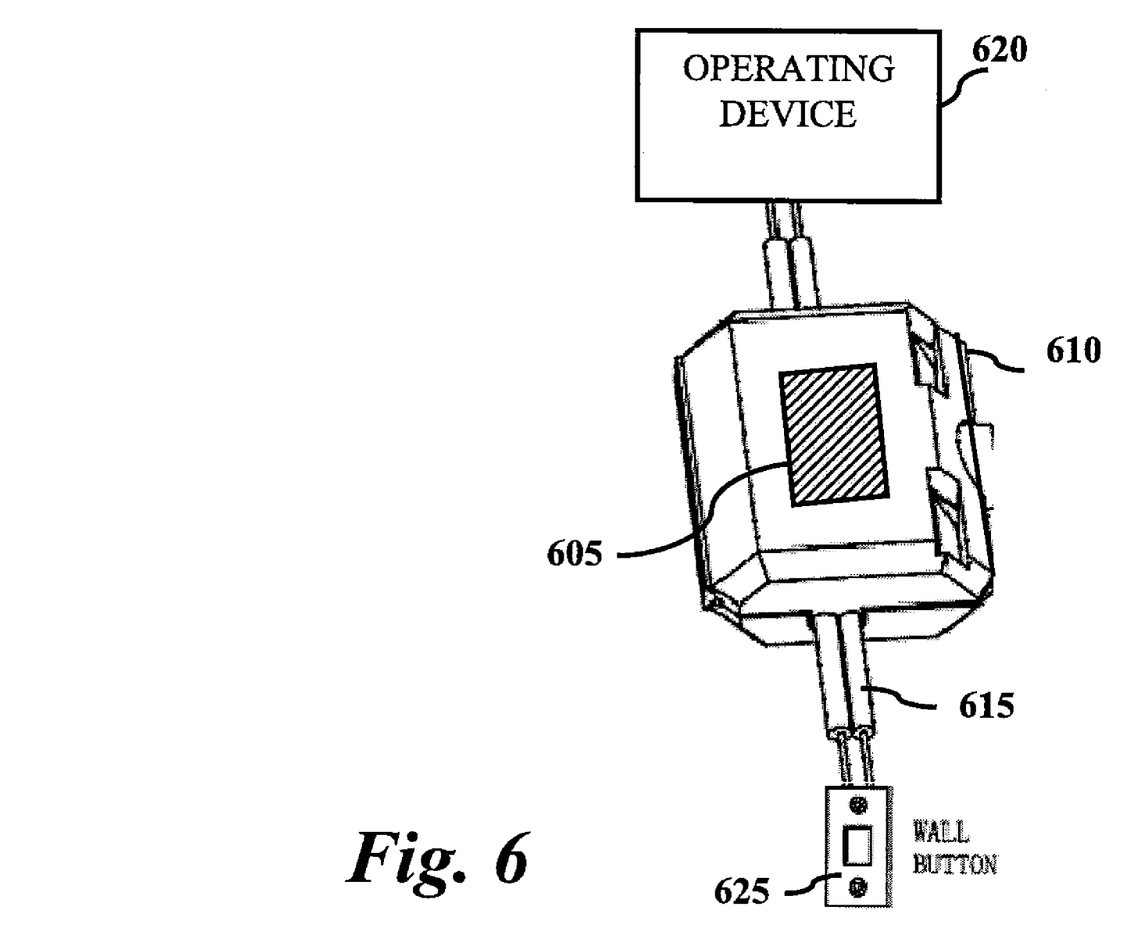
FIG. 6 depicts a graphical representation of a triggering device according to one or more embodiments of the invention.

Referring now to FIG. 6, depicted is a graphical representation of a triggering device according to one embodiment of the invention. As shown, receiving unit 605 (e.g., receiving unit 105) and connector 610 (e.g., connector 110) are depicted as a single unit according to one embodiment of the invention. Connector 610 may be coupled to signaling line 615 which couples wall button 625 to operating device 620, such that receiving unit 605 is coupled to signaling line 615 by connector 610. According to one embodiment, receiving unit 605 may be integrated into the housing of connector 610. Connector 610 may further be configured to clasp signaling line 615 as described herein. Advantages of incorporating receiving unit 605 into connector 610, as shown in FIG. 6, include ease of installation. Further, connector 610 of FIG. 6 may eliminate the need for an installer to perform wiring for coupling of a triggering device to signaling line 615.

Although, FIG. 6 depicts receiving unit 605 integrated with the housing of connector 610, it may also be appreciated that a connector (e.g., connector 110) according to the present disclosure may be integrated with a receiving unit (e.g., receiving unit 105) according to another embodiment of the invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinary skilled in the art.

What is claimed is:

1. A triggering device comprising:
   a receiving unit configured to receive one or more wireless control signals, the receiving unit including a switch and a processor, wherein the processor is configured to control the switch for activation of an operating device coupled to a signaling line based, at least in part, on the one or more wireless control signals; and
   a connector configured to electrically couple the receiving unit to the signaling line, the connector comprising one or more contacts and a housing configured to clasp the signaling line and couple the one or more contacts to the signaling line,
   wherein the signaling line relates to existing wiring of the operating device.

2. The triggering device of claim 1, wherein the one or more wireless control signals relate to control signals for operation of at least one of a movable barrier, home automation system and lighting control system.

3. The triggering device of claim 1, wherein the operating device relates to one of a garage door opener, barrier operating device, lighting control device and home automation device.

4. The triggering device of claim 1, wherein the housing is a molded housing having at least one movable portion for clasping the connector to the signaling line.

5. The triggering device of claim 1, wherein the one or more contacts include contacts for coupling to the signaling line and contacts for coupling to signaling wires electrically coupled to the receiving unit.

6. The triggering device of claim 1, wherein the housing further comprises integrated contacts to receive signaling wires of the receiving unit, wherein the integrated contacts relate to at least one of integrated pigtail contacts and mold-in contacts.

7. The triggering device of claim 1, wherein electrically coupling the connector to the signaling line does not require additional wiring or modification to the operating device.

8. The triggering device of claim 1, wherein the signaling line is coupled to an existing activation switch of the operating device, and wherein the connector is configured to allow operation of the existing activation switch.

9. The triggering device of claim 1, wherein the receiving unit further comprises a push-button switch configured for activation of the operating device.

10. The triggering device of claim 1, wherein the receiving unit is integrated with the connector housing.

11. A system for operating an existing barrier operator comprising:
    a transmitter configured to wirelessly transmit one or more control signals;
    a receiving unit configured to receive the one or more control signals and generate an activation signal on a signaling line of the barrier operator based, at least in part, on the one or more wireless control signals; and
    a connector configured to electrically couple the receiving unit to the signaling line of the barrier operator, the connector comprising one or more contacts and a housing configured to clasp the signaling line and couple the one or more contacts to the signaling line,
    wherein the signaling line relates to existing wiring of the barrier operator.

12. The system of claim 11, wherein the transmitter is configured to encode the one or more control signals with an encoding scheme not recognized by the barrier operator.

13. The system of claim 11, wherein the barrier operator relates to a garage door opener.

14. The system of claim 11, wherein the housing is a molded housing having at least one movable portion for clasping the connector to the signaling line.

15. The system of claim 11, wherein the one or more contacts include contacts for coupling to the signaling line and contacts for coupling to signaling wires electrically coupled to the receiving unit.

16. The system of claim 11, wherein the housing further comprises integrated contacts to receive signaling wires of the receiving unit, wherein the integrated contacts relate to at least one of integrated pigtail contacts and mold-in contacts.

17. The system of claim 11, wherein the signaling line is coupled to an existing activation switch of the operating device, and wherein the connector is configured to allow operation of the existing activation switch.

18. The system of claim 11, wherein the receiving unit further comprises a push-button switch configured for activation of the operating device.

19. The system of claim 11, wherein the receiving unit is integrated with the housing of the connector.

20. The system of claim 11, wherein the connector is configured to by electrically coupled to the signaling line without installation of additional wiring or modification to the operating device.

* * * * *